United States Patent Office 2,788,619
Patented Apr. 16, 1957

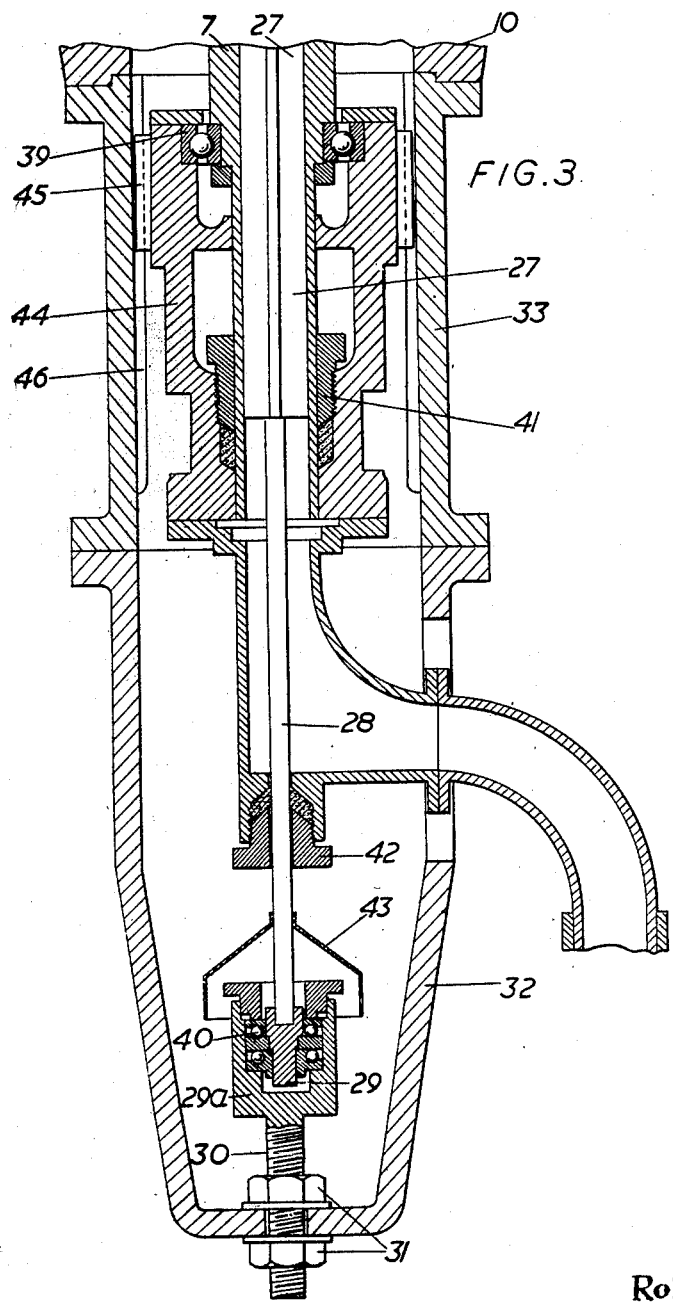

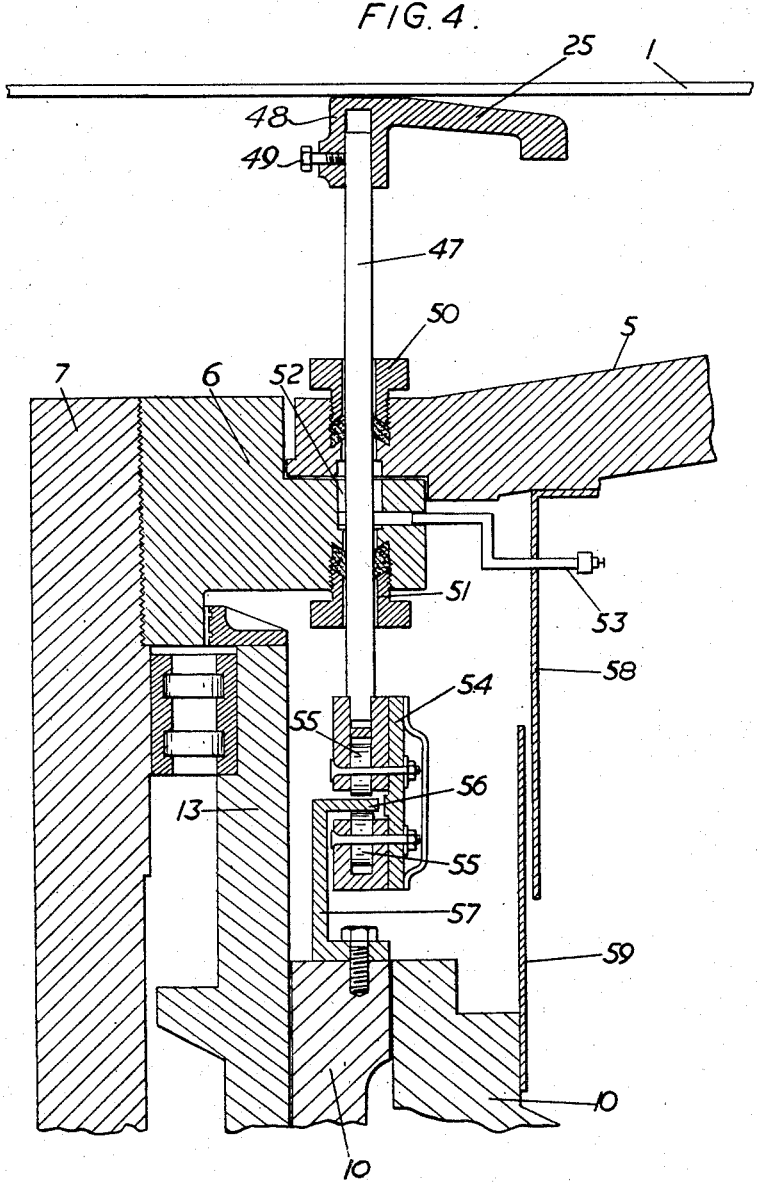

2,788,619

GRINDING MACHINES SIMULTANEOUSLY WORKING BOTH SURFACES OF A CONTINUOUS RIBBON OF GLASS

Robert Touvay, Paris, France, assignor to Societe Anonyme des Manufactures des Glaces et Produits Chimiques de Saint Gobain, Chauny & Cirey, Paris, France, a French company Application September 10, 1954, Serial No. 455,293

Claims priority, application France September 12, 1953

14 Claims. (Cl. 51—112)

This invention relates to apparatus for simultaneously grinding both faces of a continuous ribbon of glass.

A well known form of such apparatus is sometimes referred to as "the twin" and is characterised by the ribbon of glass being supported on the lower grinding elements as the ribbon is advanced between opposed series of upper and lower grinding elements. The method of operating such apparatus is fully described in United States patent specification No. 1,729,498. Such apparatus in practice includes a series of tools alternating with transverse pairs of rollers, each of the tools comprising a coaxial pair of opposed grinder discs, each of the discs rotating about a vertical axis, between which discs, the ribbon, continually formed from molten glass in a glass melting tank, is advanced. As the ribbon moves forward it is supported by the bottom grinder discs and lower rollers of the pairs of rollers and as many pairs of the rollers as is necessary to advance the glass at the requisite rate are driving rollers engaging both surfaces of the ribbon.

By suitable adjustment of the level of the bottom discs, the working plane thereof is made to coincide constantly with the plane of the upper generatrices of the driving rollers on which the ribbon of glass rests, whatever the degree of wear on the discs.

As the grinding surfaces of the disc have the form of an annulus, the result is that the ribbon of glass is deprived of support in the central part of the disc, and also outside the latter in the triangular shaped areas between the outside edge of each disc and the nearest supporting rollers.

The main object of the present invention is to create a device to avoid deflection of the ribbon of glass in the areas thus defined where it has no support and is consequently subject to bending under the effect of its own weight, which bending may cause breakages of the ribbon of glass which are the more to be feared the thinner the ribbon being subjected to the grinding operation.

Such breaks are produced in particular at the moment the ribbon of glass becomes engaged between two discs of one and the same pair, when the flat ribbon meets the virtually serrated annular grinding surface of the bottom disc either outside or inside this grinding surface.

In accordance with the present invention apparatus of the kind set forth for grinding a horizontally disposed ribbon of glass on both faces simultaneously is characterised by bottom grinder discs, within the central cavity of each of which is mounted a support for the ribbon constituted by a concentric ring at about the level of the plane containing the top generatrices of the associated glass supporting rollers for the strip-like zones of the ribbon which overlie the central cavities of the discs as the ribbon is advanced across the grinding surfaces of the discs.

In order that the invention may be more clearly understood preferred embodiments thereof will now be described by way of example, with reference to the accompanying drawings in which:

Fig. 3 is a fragmentary sectional elevation of the construction shown in Fig. 1, to a different scale, showing the manner of mounting the axial member which carries the coaxial support.

Fig. 4 is a view similar to Fig. 2 showing a modified manner of mounting the coaxial support and Fig. 5 is a diagrammatic plan view showing marginal supporting skids used in conjunction with the coaxial support in accordance with the invention.

In the drawings like reference numerals designate the same or similar parts.

Figure 1:
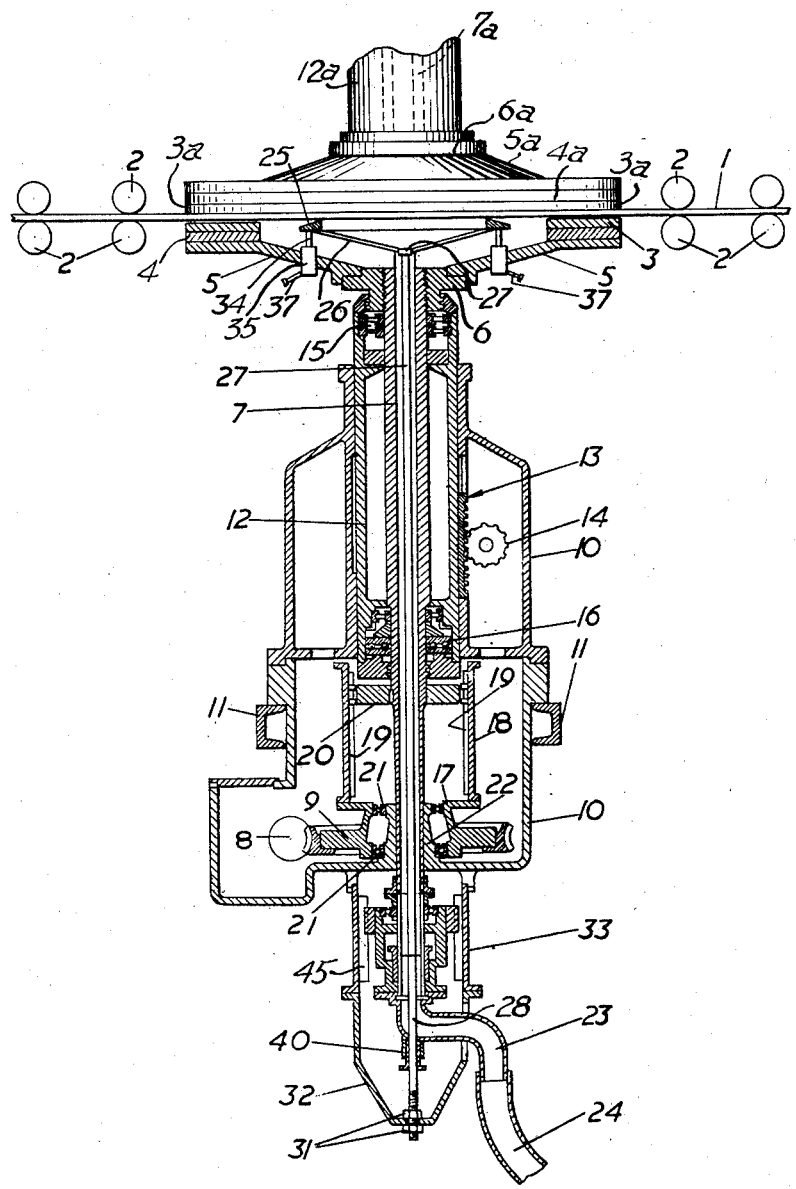
Fig. 1 is a diagrammatic sectional elevation through a lower tool of a "twin" form of apparatus for simultaneously grinding glass on both faces, the grinder disc of the tool being provided with a coaxial support for the ribbon in accordance with the invention.
Figure 2:
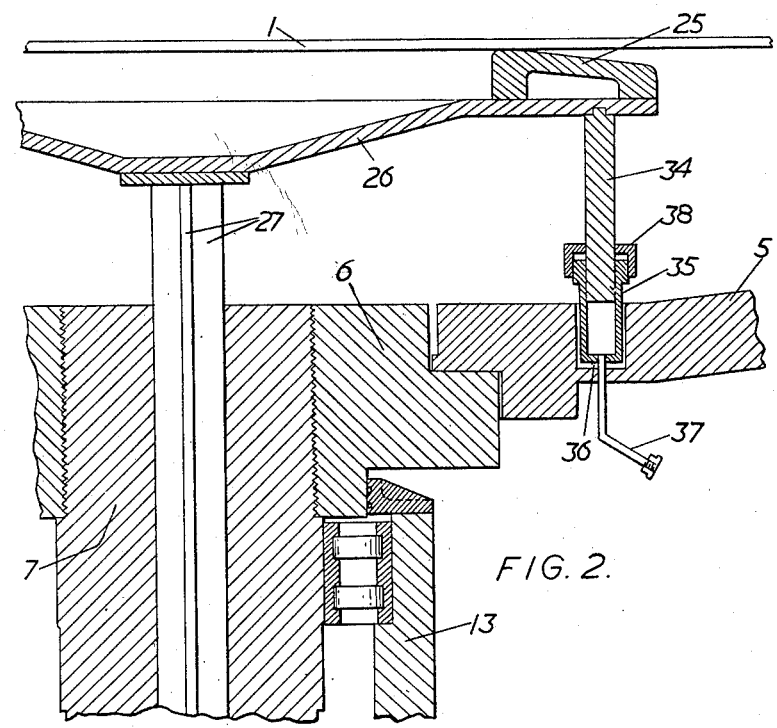
Fig. 2 is a fragmentary sectional elevation, showing to a larger scale the manner of mounting the support shown in Fig. 1 in its respective disc.

Referring first to Figs. 1–3 of the drawings, a ribbon of glass 1 advancing from a lehr (not shown) passes between pairs of rollers 2, arranged to each side of a coaxial pair of tools each including a grinder disc indicated at 3 and 3a. In apparatus of the kind to which the invention relates the advancing ribbon is supported on the lower rollers of the pairs and the lower grinding discs, this arrangement being characteristic of the so called "twin" grinding apparatus.

The grinder disc 3 of the lower tool, in known manner, is mounted on a backing plate 4 in turn carried by an adapter plate 5 which is bolted to the head 6 of a coaxial tube 7 through which abrasive in an aqueous suspension flows up under the requisite hydrostatic head to the central cavity of the tool defined between the grinding surface of the tool and adapter plate 5.

The tube 7 is driven by gearing 8, 9 in manner hereinafter described so that the grinder disc rotates at the requisite speed and a centrifugal force is developed in the central cavity which projects the aqueous suspension between the ribbon of glass and the grinder disc.

The tool, including the disc 3 is carried by a supporting structure including a housing 10 and support 11 therefor. Within the upper part of the housing a sleeve 12 is slidably mounted, the vertical displacement of which is regulated through the agency of a rack 13 and pinion 14, the sleeve being suitably associated with the tube 7 by bearing elements indicated at 15 and 16.

Thus in known manner, the grinder disc 3 may be axially adjusted so that its grinding surface is always in the plane containing the upper generatrices of lower (supporting) rollers 2 and the drive to the disc is maintained during regulation in height of the disc by the gear 9 being provided with a parallel plate 17 on which are mounted brackets 18 each carrying a long key 19, with which keys engage a suitably slotted disc 20 fixed to the tube 7, and the wheel 9 is located by antifriction bearings 21 on a boss 22 formed on the base of the housing 10. The aqueous suspension is fed to the tube 7 through a connection 23 and hose 24.

In Fig. 1 the coaxial upper grinding disc is indicated at 3a and the associated backing plate and adaptor plate at 4a and 5a respectively, the hollow driving shaft for the apparatus being indicated at 7a and the concentric sleeve at 12a.

In the illustrated embodiment of the invention, a ring support 25 is located coaxially within the central cavity of the grinder disc 3. The ring may be made of any suitable metal e. g. cast iron and its dimensions are calculated in such a way that the deflection of the part of the ribbon supported either between the ring and the grinding surface of the disc or inside the ring shall be small and shall not create any danger of breaking. The top surface of the ring preferably has the general shape of a truncated cone so as to facilitate the engagement of the ribbon of glass on the said ring. Its position in the vertical direction is regulated once and for all so that its top surface shall be in the plane formed by the upper generatrices of the rollers supporting the ribbon of glass or slightly below this plane. To this end the ring 25 is mounted on a metal disc 26, itself assembled at the end of a rod 27 passing inside the tube 7. This rod is preferably of cruciform cross section to assure its rigidity whilst allowing the requisite volume of abrasive in suspension to be forced up the tube 7. This rod is extended at the bottom by a round rod 28 which is supported at its base on a footstep bearing 29 carried in a cup 29a having a threaded shank 30 adjustable upwards and downwards in relation to the supporting structure 10 by means of nuts 31, the shank passing through an extension 32, 33 of the housing 10.

The drive of the ring 25 is assured by depending arms 34 fixed under the disc 26 at regular intervals along the circumference of the disc. Each arm moves in a cup 35 defining a socket closed at its base which may be located in a blind recess 36, as shown in Fig. 2. The cup is completely filled with grease by means of the lubricator 37 and, within the adaptor plate 5 is fitted with a cap 38 screwed on to its rim. In the course of the raising of the disc 3, the grease completely fills the cup up to the cap and always remains under pressure and stops any entry of water and abrasive into the interior of the cup.

At the bottom of the tool, the protection of ball bearings 39 and 40 against the entry of abrasives is assured respectively by the stuffing boxes 41 and 42. A supplementary hood protection of the bearing 40 is provided at 43.

It is to be observed that the metal disc 26 is formed so as to follow the general flow of aqueous suspension from the tube to the surface of the grinder disc thus the regular distribution of the suspension is not impaired by the presence of the disc. Moreover in the construction illustrated the ring 25 gives support to glass moving over the central cavity in a zone near the mean distance between the axis of the grinder disc and the inside periphery of the grinding surface of the disc.

As clearly shown in Fig. 3 the ball bearing 39 and gland 41 are mounted in sleeve 44 carrying feathers 45 which move in guides 46 in the housing member 33 so that the whole assembly moves with any adjustment of tube 7.

Referring now to the construction illustrated in Fig. 4. In this arrangement the supporting ring 25 is carried by the supporting structure 10, 10, because although the grinder disc 3 is subject to considerable wear and therefore requires adjustment, the supporting ring 25 is subjected only to negligible wear. This result is achieved by mounting the ring 25 on a circular series of posts 47, one of which is shown at 47, the ring having a corresponding number of sockets 48 each provided with clamping means indicated at 49 for securing the ring to all the posts at the desired level.

The posts extend downwardly through the adaptor plate 5 and the head 6 of the feed tube 7 and gland packings 50, 51 prevent seepage of the aqueous suspension along the posts, but as an additional precaution a chamber 52 is formed between the glands and this is filled with grease under pressure supplied through pipe 53. The posts are each provided at their lower end with a chassis 54 on which is carried a pair of wheels 55, one over the other in a vertical plane, and between the wheels is a track 56 comprised in an angle ring 57 secured to the supporting structure 10. Thus the top surface of the ring 25 is held in desired relation with the grinding surface of the disc to support the part of the ribbon of glass 1 which overlies the central cavity in the disc.

Figure 5:
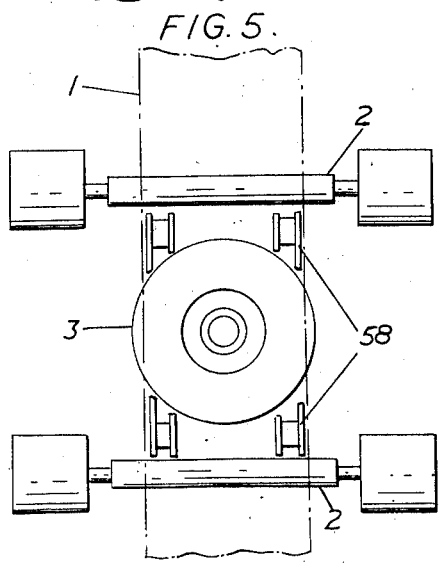

Reference has already been made to the possibility of the ribbon of glass bending downwardly between the grinder disc and the contiguous pairs of rollers and the illustrated embodiment of the invention shown in Fig. 5 comprises skids 58 to support the ribbon in the triangular areas between the grinder disc and the rollers. The skids are in nature short lengths of rails which may be carried on brackets (not shown), mounted on the housing 10 so that the top surfaces of the rails are located in the plane containing top generatrices of the supporting rollers 2.

By the present invention a simple means, easy to install and operate, is provided in "twin" grinding apparatus, for supporting the ribbon of glass in the areas which pass over the central cavity of the grinders and in the marginal areas which pass between the roller pairs and the grinder discs, the support given by constructions according to the invention being such that if there is any deflection of the glass into the cavity of the grinder disc or between the grinders and the associated roller pairs, the deflection is so small that no danger arises from the deflection. Instead of using the ring 25 which gives support to the glass in a circular zone disposed about half way between the inner edge of the grinder surfaces and the axis of the grinder, a disc may be employed, as will be well understood, so that a continuous support is given across the ring 25.

In the construction shown in Figs. 1–4, the disc may be mounted on the rod 27 in the same manner as the ring 25 is mounted, or the disc may be carried on posts such as 47 (see Fig. 4) in exactly the same way as the ring 25 is mounted in the construction illustrated in Fig. 4. It will be appreciated that if the ring 25 is mounted on the axis rod 27 as its sole support, that is to the elimination of depending arms such as 34, the disc 25 may be stationary or rotate at a different speed to that of the grinder disc; it may be fixed or if a foot step bearing is used, as shown in Fig. 3, it may rotate at a different speed due to the movement of the aqueous suspension in the central cavity of the grinder disc.

I claim:

1. An apparatus for simultaneously grinding both faces of a ribbon of glass while being advanced longitudinally substantially horizontally, comprising two longitudinal series of rotatable grinding discs extending along the path of advancement of the ribbon, with the axes of the discs extending substantially perpendicular to the ribbon, said two series being arranged on opposite sides of said path, so that one series operates on one face of the ribbon and the other series operates on the other face, rollers on opposite sides of the path of the ribbon for advancing the ribbon between the two series of discs to effect the grinding operation, each of said grinding discs presenting an annular grinding surface to the ribbon and a central cavity encompassed by the respective annular grinding surface, a hollow driving shaft for each of said discs, abrasive fluid being adapted to be fed through each of said shafts and into the respective cavity, and a ring within the central cavity of each of the lower discs concentric with said lower discs and positioned at about the level of the plane containing top generatrices of the lower rollers, said ring having such dimensions that any deflection of the glass ribbon into the space within the ring or into the annular space between the ring and the periphery of the cavity is so small as to eliminate the possibility of breakage due to deflection.

2. An apparatus for simultaneously grinding both faces of a ribbon of glass as defined in claim 1, wherein there is provided an axial member for supporting each of said rings extending through the respective hollow driving shaft of the respective lower grinding disc and having a cross-section affording clearance for the flow of abrasive fluid through the respective shaft to the respective central cavity.

3. An apparatus for simultaneously grinding both faces of a ribbon of glass as defined in claim 1, wherein there is provided a pair of skids below the path of the ribbon near each edge of said path and on opposite sides of each lower grinding disc to assist in supporting the ribbon, each skid being located between the respective lower disc and the respective adjoining lower roller.

4. An apparatus for simultaneously grinding both faces of a ribbon of glass while being advanced longitudinally substantially horizontally, comprising two longitudinal series of rotatable grinding discs extending along the path of advancement of the ribbon, with the axes of the discs extending substantially perpendicular to the ribbon, said two series being arranged on opposite sides of said path, so that one series operates on one face of the ribbon and the other series operates on the other face, rollers on opposite sides of the path of the ribbon for advancing the ribbon between the two series of discs to effect the grinding operation, each of said grinding discs presenting an annular grinding surface to the ribbon and a central cavity encompassed by the respective annular grinding surface, a hollow driving shaft for each of said discs, abrasive fluid being adapted to be fed through each of said shafts and into the respective cavity, a ring within the central cavity of each of the lower discs concentric with said lower disc and positioned close to the supporting level of the lower rollers to limit deflection of the ribbon into the respective cavity, and to eliminate thereby the breaking of the ribbon due to such deflection and arms depending from each ring, the lower discs having respective structures with cavity sockets into which said arms extend respectively, an apertured cap for each socket, each of said arms passing through the respective cap into the respective socket, and means for maintaining a fluid under pressure in said sockets.

5. An apparatus for simultaneously grinding both faces of a ribbon of glass while being advanced longitudinally substantially horizontally, comprising two longitudinal series of rotatable grinding discs extending along the path of advancement of the ribbon, with the axes of the discs extending substantially perpendicular to the ribbon, said two series being arranged on opposite sides of said path, so that one series operates on one face of the ribbon and the other series operates on the other face, rollers on opposite sides of the path of the ribbon for advancing the ribbon between the two series of discs to effect the grinding operation, each of said grinding discs presenting an annular grinding surface to the ribbon and a central cavity encompassed by the respective annular grinding surface, a hollow driving shaft for each of said discs, abrasive fluid being adapted to be fed through each of said shafts and into the respective cavity, a ring within the central cavity of each of the lower discs concentric with said lower disc and positioned close to the supporting level of the lower rollers to limit deflection of the ribbon into the respective cavity, and to eliminate thereby the breaking of the ribbon due to such deflection, each of the central cavities of the lower discs having a wall, said apparatus comprising posts depending from each ring through the respective cavity wall, a fluid seal about the respective post where it passes through the respective wall, a pair of wheels carried at the lower end of each depending post, the wheels of each pair being spaced in a vertical direction, and a track for the wheels of each pair located between the wheels of each pair and supporting the respective ring in desired relation to the ribbon path.

6. An apparatus for simultaneously grinding both faces of a ribbon of glass while being advanced longitudinally horizontally, comprising grinding discs arranged on opposite sides of the path of advancement of the ribbon, rollers on opposite sides of the path of the ribbon for advancing the ribbon between the discs to effect the grinding operation, each grinding disc presenting an annular grinding surface to the ribbon and a central cavity encompassed by the respective annular grinding surface, and a ring within the central cavity of each of the lower discs, concentric with said lower disc, positioned at about the level of the plane containing the top generatrices of the lower rollers, and having such dimensions with respect to those of the central cavity that any deflection of the glass into the space within the ring or into the annular space between the ring and the periphery of the cavity is so small as to eliminate the possibility of breakage due to deflection.

7. An apparatus according to claim 6, in which the ring is at a level slightly below the plane containing the top generatrices of the lower rollers.

8. An apparatus according to claim 6, in which the cross-section of the ring is like the axial cross-section of a truncated cone having an axial cylindrical bore.

9. An apparatus according to claim 6, in which each ring is adapted to rotate around its axis as the grinding disc with which it is associated rotates.

10. An apparatus according to claim 6, in which each ring is adapted to remain stationary as the grinding disc with which it is associated rotates.

11. An apparatus according to claim 6, in which supporting means are provided for the glass ribbon in the triangular shaped areas between the outside edge of a disc and the nearest supporting roller.

12. An apparatus for simultaneously grinding both faces of a ribbon of glass while being advanced horizontally, comprising grinding discs arranged on opposite sides of the path of advancement of the ribbon, rollers on opposite sides of the path of the ribbon for advancing the ribbon between the discs to effect the grinding operation, each grinding disc presenting an annular grinding surface to the ribbon and a central cavity encompassed by the respective annular grinding surface, and a support within the central cavity of each of the lower discs, positioned at about the level of the plane containing the top generatrices of the lower rollers, and having such dimensions and such location with respect to the dimensions of the central cavity that any deflection of the glass into the cavity is so small as to eliminate the possibility of breakage due to deflection.

13. An apparatus according to claim 12 wherein the support is of circular shape.

14. An apparatus according to claim 12 in which supporting means are provided for the glass ribbon in the triangular shaped areas between the outside edge of a disc and the nearest supporting roller.

References Cited in the file of this patent

UNITED STATES PATENTS

| | | |
|---|---|---|
| 1,457,845 | Lochhead | June 5, 1923 |
| 1,932,305 | Escole | Oct. 24, 1933 |
| 1,962,767 | Crowley | June 12, 1934 |
| 2,041,642 | Griffin | May 19, 1936 |
| 2,209,711 | Young | July 30, 1940 |
| 2,270,362 | Waldron | Jan. 20, 1942 |
| 2,308,976 | Indge | Jan. 19, 1943 |
| 2,673,423 | Hoyet | Mar. 30, 1954 |
| 2,673,428 | Cook | Mar. 30, 1954 |
| 2,690,034 | Laverdisse | Sept. 28, 1954 |
| 2,699,021 | Laverdisse | Jan. 11, 1955 |